(12) United States Patent
Oota

(10) Patent No.: US 7,023,636 B2
(45) Date of Patent: Apr. 4, 2006

(54) INFORMATION RECORDING/REPRODUCING APPARATUS

(75) Inventor: Kazunari Oota, Tokyo (JP)

(73) Assignee: Sony Corporation, Tokyo (JP)

( * ) Notice: Subject to any disclaimer, the term of this patent is extended or adjusted under 35 U.S.C. 154(b) by 128 days.

(21) Appl. No.: 10/478,803

(22) PCT Filed: May 29, 2002

(86) PCT No.: PCT/JP02/05231

§ 371 (c)(1),
(2), (4) Date: Nov. 25, 2003

(87) PCT Pub. No.: WO02/097813

PCT Pub. Date: Dec. 5, 2002

(65) Prior Publication Data

US 2004/0169949 A1    Sep. 2, 2004

(30) Foreign Application Priority Data

May 29, 2001    (JP) ............................. 2001-160643

(51) Int. Cl.
*G11B 5/09* (2006.01)
(52) U.S. Cl. ..................................................... 360/48
(58) Field of Classification Search ................. 360/48, 360/31, 70, 72.2; 369/47.12; 386/75, 81, 386/80, 93, 65, 46, 68
See application file for complete search history.

(56) References Cited

U.S. PATENT DOCUMENTS

| | | | | |
|---|---|---|---|---|
| 3,585,291 A | * | 6/1971 | Yamakawa | 360/70 |
| 3,959,818 A | * | 5/1976 | Iketaki | 360/70 |
| 4,171,530 A | * | 10/1979 | Landau | 360/70 |
| 4,887,171 A | * | 12/1989 | Rose | 360/31 |
| 5,223,991 A | * | 6/1993 | Nagai et al. | 360/72.2 |
| 5,229,890 A | * | 7/1993 | Okauchi | 386/65 |
| 5,253,257 A | * | 10/1993 | Murakami | 714/771 |
| 5,311,492 A | * | 5/1994 | Tabuchi et al. | 369/47.12 |
| 5,369,532 A | * | 11/1994 | Dodt et al. | 360/48 |
| 5,392,163 A | * | 2/1995 | Higuchi et al. | 386/75 |
| 5,477,396 A | * | 12/1995 | Fukami et al. | 386/81 |
| 5,517,322 A | * | 5/1996 | Hirayama | 386/93 |
| 5,648,855 A | * | 7/1997 | Yanagihara | 386/80 |

(Continued)

FOREIGN PATENT DOCUMENTS

JP        4-195703        7/1992

(Continued)

*Primary Examiner*—David Hudspeth
*Assistant Examiner*—Fred F. Tzeng
(74) *Attorney, Agent, or Firm*—Frommer Lawrence & Haug LLP; William S. Frommer

(57) ABSTRACT

A playback error associated with overwriting on a narrow-width track is prevented from occurring in the overwritten portion. A signal generator (11) generates a signal of a predetermined data pattern that stabilizes the operation of a synchronizing pulse generator of a playback system (shown in a separate figure). A timing generator (4) switches over a switch (12) to the output of the signal generator (11), at least a period of time equivalent to writing of one track before the main signal is input. When a signal of the predetermined data pattern from the signal generator (11) has been output, the timing generator (4) switches over the switch (12) to the main signal. The playback system includes a circuit which discriminates between the predetermined data pattern and the main signal data from a playback signal generated by playing back a record on a magnetic tape (T).

6 Claims, 3 Drawing Sheets

U.S. PATENT DOCUMENTS

| | | | |
|---|---|---|---|
| 5,659,400 A * | 8/1997 | Edakubo et al. | 386/46 |
| 5,671,066 A * | 9/1997 | Hirayama | 386/46 |
| 5,812,734 A * | 9/1998 | Shimoda et al. | 386/81 |
| 6,711,345 B1 * | 3/2004 | Tohyama et al. | 386/68 |
| 6,804,072 B1 * | 10/2004 | Yohda et al. | 360/31 |

FOREIGN PATENT DOCUMENTS

| | | |
|---|---|---|
| JP | 8-273248 | 10/1996 |
| JP | 2000-123489 | 4/2000 |

* cited by examiner

INFORMATION RECORDING/REPRODUCING APPARATUS

This application is a 371 of PCT/JP02/05231 May 29, 2002.

TECHNICAL FIELD

The present invention relates to information recording and playback apparatuses and specifically to an information recording and playback apparatus for preventing a playback error in an overwritten portion associated with an increase in recording density achieved by narrowing the track width of a magnetic tape apparatus.

BACKGROUND ART

A typical apparatus for reading and writing information through sequential access, such as a magnetic tape recording and playback apparatus, reads and writes information for every track and therefore requires highly precise tracking (track following function) during recording and playback of information. In playback mode, the range of the track width corresponds to the scanning area of a playback head.

Such high-precision tracking is also required during overwriting (writing new information to an already-written tape), and a portion changed by overwriting is also processed for every track.

A high density is achieved by narrowing the minimum writing unit (track width); a narrowed track width, however, often prevents successful tracking.

In response to recent demands for recording media with increased storage capacity, the effective track width is narrower than the width of the scanning area of the playback head, inevitably causing the width of the scanning area of the playback head to span two contiguous tracks in some cases.

Unfortunately, a conventional information recording and playback apparatus often generates an error during playback due to a narrowed track width if the width of the scanning area of the playback head spans two contiguous tracks, especially if one of the two contiguous tracks is an already-written track and the other is a newly written track.

The mechanism of the generation of the error described above is as follows: narrow-width tracks cause a track in a newly written portion to shift with respect to the original track or causes the frequency of recorded tracks to differ between the newly written portion and the original portion due to differences in the recording system during recording, leading to poor frequency-locking of a phase locked loop (PLL) used in the playback system and finally to loss of synchronization. In short, such an error results from mixing of old original data and newly written data or a malfunction of the PLL.

In order to solve these shortcomings associated with the conventional information recording and playback apparatus, an object of the present invention is to provide an information recording and playback apparatus for preventing the generation of a playback error in a portion of narrow-width tracks having information overwritten thereon.

DISCLOSURE OF INVENTION

In order to solve the shortcomings described above, the present invention provides an information recording and playback apparatus using a magnetic tape as a recoding medium, comprising signal addition means for adding a predetermined data pattern to the leading end of main data to be recorded onto the magnetic tape during recording, the predetermined data pattern stabilizing the operation of synchronizing-pulse supply means of a playback system; data recording means for recording data generated by the signal addition means onto the magnetic tape; and data discrimination means for discriminating, during playback, between the recorded predetermined data pattern and the recorded main data from a playback signal generated by playing back a record on the magnetic tape.

The present invention is achieved by the recording system and the playback system as described below. In overwriting (writing new data on old data) mode, the recording system allows the predetermined data pattern for one track (track-pattern data) to be additionally written at the leading end of the newly written data, the predetermined data pattern stabilizing the operation of the synchronizing-pulse supply means (hereinafter referred to as PLL) used in the playback system. In playback mode of the newly written data, the playback system allows the PLL to receive a playback signal which includes a signal component of the predetermined data pattern. These features ensure that an accurate clock for playback synchronization is generated by the PLL of the playback system from the beginning of playback of the newly written data, preventing the generation of an error during playback of the newly written data.

BEST MODE FOR CARRYING OUT THE INVENTION

An embodiment of the present invention will now be described with reference to the drawings.

Figure 1:
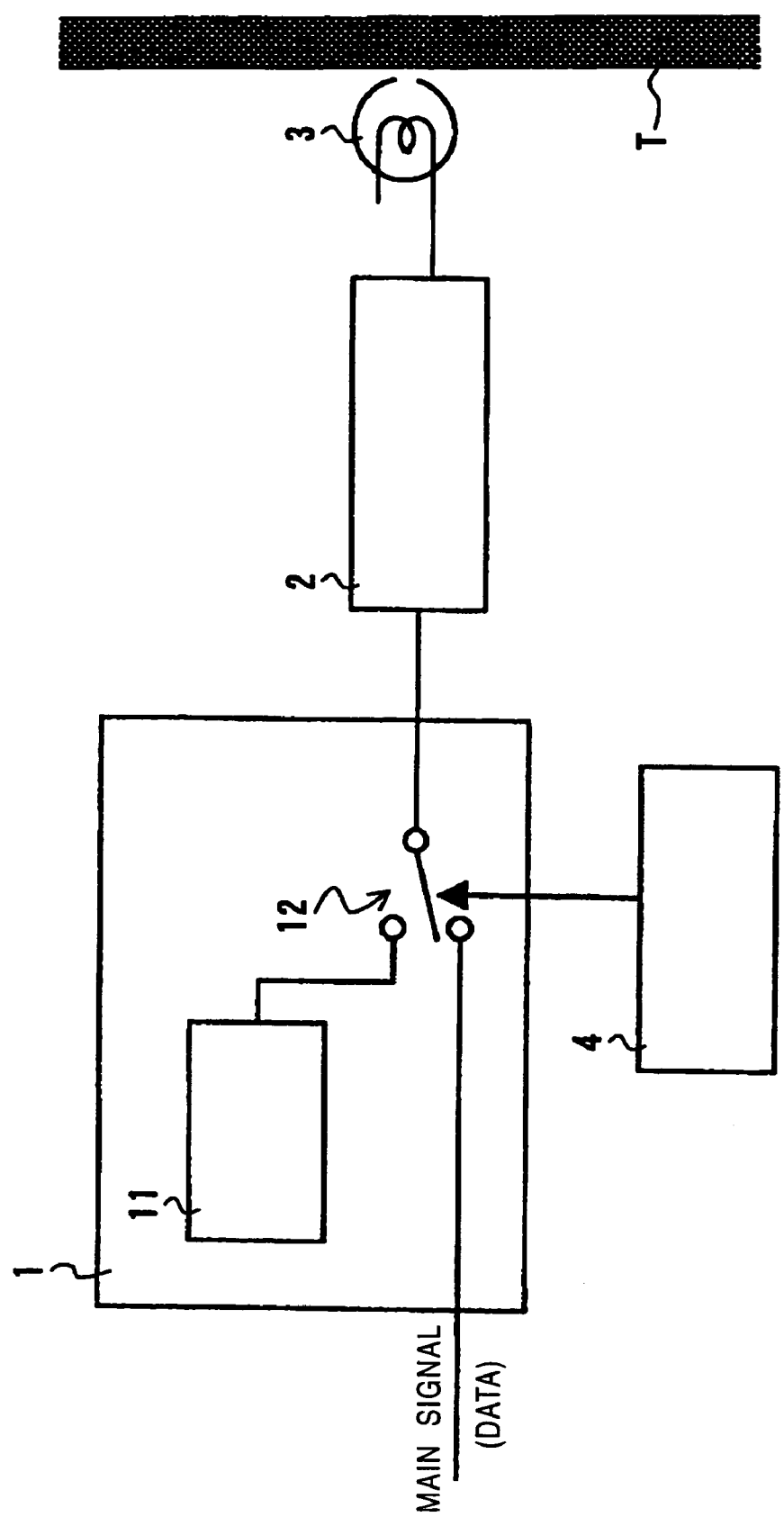
FIG. 1 is a block diagram of a recording system of an information recording and playback apparatus according to an embodiment of the present invention.

FIG. 1 is a block diagram of a recording system of an information recording and playback apparatus according to the embodiment of the present invention.

The recording system of the information recording and playback apparatus according to the embodiment includes a signal adder 1 (signal addition means) which adds a predetermined data pattern to main signal data; a recording-signal processing circuit 2 (data recording means) which converts an internal signal (an additional signal component of the predetermined data pattern and a signal component of the main signal data) of data to be written into a recording signal; a recording head 3 (data recording means) which records the data to be written based on the input recording signal; and a timing generator 4 which determines the timing for adding the predetermined data pattern to the main signal data.

The signal adder 1 includes a signal generator 11 (signal generation means) which generates a signal of the predetermined data pattern and a switch 12 (switching means) which toggles between the main signal (data) and the additional signal of the predetermined data pattern.

In FIG. 1, symbol T denotes a tape (magnetic tape) as a recording medium.

The recording-signal processing circuit 2 may, for example, be a D/A converter and others.

Figure 2:
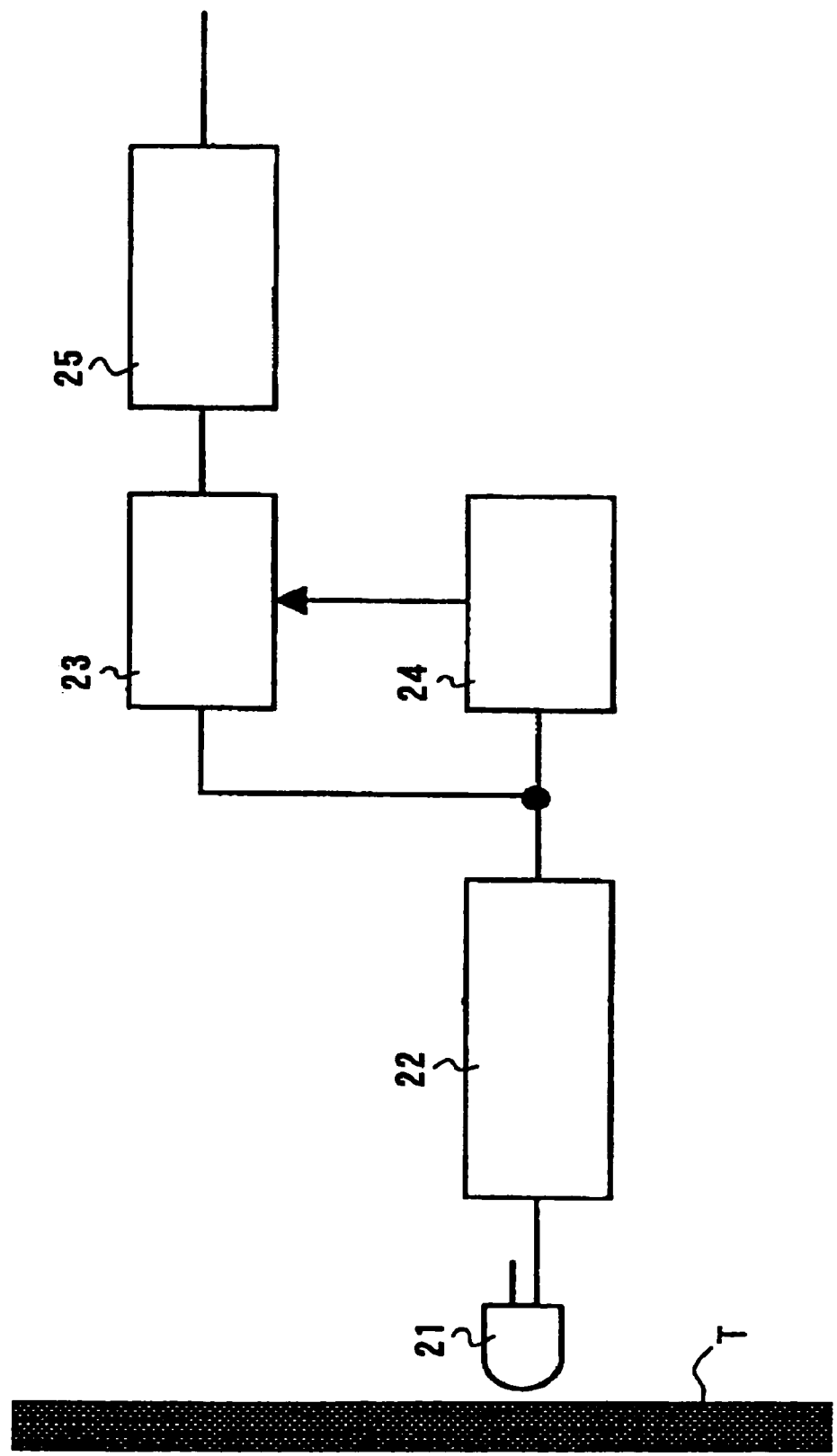
FIG. 2 is a block diagram of a playback system of the information recording and playback apparatus according to the embodiment of the present invention.

FIG. 2 is a block diagram of a playback system of the information recording and playback apparatus according to the embodiment of the present invention.

The playback system of the information recording and playback apparatus according to the embodiment includes a playback head 21 which converts data recorded on the tape T to a playback signal; a playback-signal processing circuit 22 which converts the playback signal to an internal signal; an A/D converter 23 which performs A/D conversion of the internal signal output by the playback-signal processing circuit 22; a PLL 24 which extracts a clock from the internal signal output by the playback-signal processing circuit 22 and then supplies the A/D converter 23 with the extracted clock; and a signal discrimination circuit 25 (data discrimination means) which discriminates between the signal of the main signal data and the signal of the predetermined data pattern from the signal output by the A/D converter 23.

The operation of the information recording and playback apparatus according to the embodiment will now be described with reference to FIGS. 1 and 2.

First, the operation of the recording system will be described with reference to FIG. 1.

To record data on the tape T, the signal adder 1, which has received the main signal of the data, adds a signal of the predetermined data pattern to the leading end of this main data and sends the resultant signal to the recording-signal processing circuit 2.

More specifically, an external system for sending the data sends a data writing notification to an input line (not shown in FIG. 1) of the timing generator 4, at least a period of time equivalent to writing of one track before sending the data.

Upon receiving the notification, the timing generator 4 switches over the switch 12 of the signal adder 1 to the signal generator 11. As a result, a signal of the predetermined data pattern generated by the signal generator 11 of the signal adder 1 is sent to the recording-signal processing circuit 2. After the time equivalent to writing of one track has elapsed, the timing generator 4 operates the switch 12 so that the recording-signal processing circuit 2 receives the main signal.

The signal of the predetermined data pattern generated by the signal generator 11 of the signal adder 1 may be of any kind that can be detected with high sensitivity by the PLL 24 of the playback system described later and that can stabilize the operation of the PLL 24, which is capable of stably supplying an accurate clock when receiving the signal. For example, the signal has a stripe pattern consisting of two different values repeated alternately and regularly (2T pattern).

The recording-signal processing circuit 2 converts the signal of the predetermined data pattern generated by the signal generator 11 of the signal adder 1 and the subsequent main signal to a signal for playback and then sends the signal for playback to the recording head 3. This conversion may include D/A conversion and modulation.

The recording head 3 then records the signal for playback on the tape T.

The operation of the playback system (a counterpart of the recording system described above) will be described with reference to FIG. 2.

First, the playback head 21 converts data recorded on the tape T to a signal for playback and then sends the signal for playback to the processing circuit 22.

The processing circuit 22 converts the sent signal for playback to the internal signal and then sends the internal signal to the A/D converter 23 and the PLL 24.

The A/D converter 23 performs A/D conversion of the sent internal signal using the clock sent by the PLL 24 and then sends the resultant signal to the signal discrimination circuit 25.

The PLL 24 generates the clock (synchronizing clock) from the internal signal sent by the processing circuit 22 and sends the clock to the A/D converter 23. This internal signal includes the signal component of the predetermined data pattern recorded by the relevant recording system, in which the signal component of the predetermined data pattern is added to the leading end of the signal component of the written data, thereby allowing the PLL 24 to ensure the generation of an accurate clock.

The signal discrimination circuit 25, which is characteristic to the playback system of the present invention, discriminates between the predetermined data pattern and the subsequent written data from the internal digital signal sent by the A/D converter 23. The extracted predetermined data pattern may be discarded.

Figure 3:
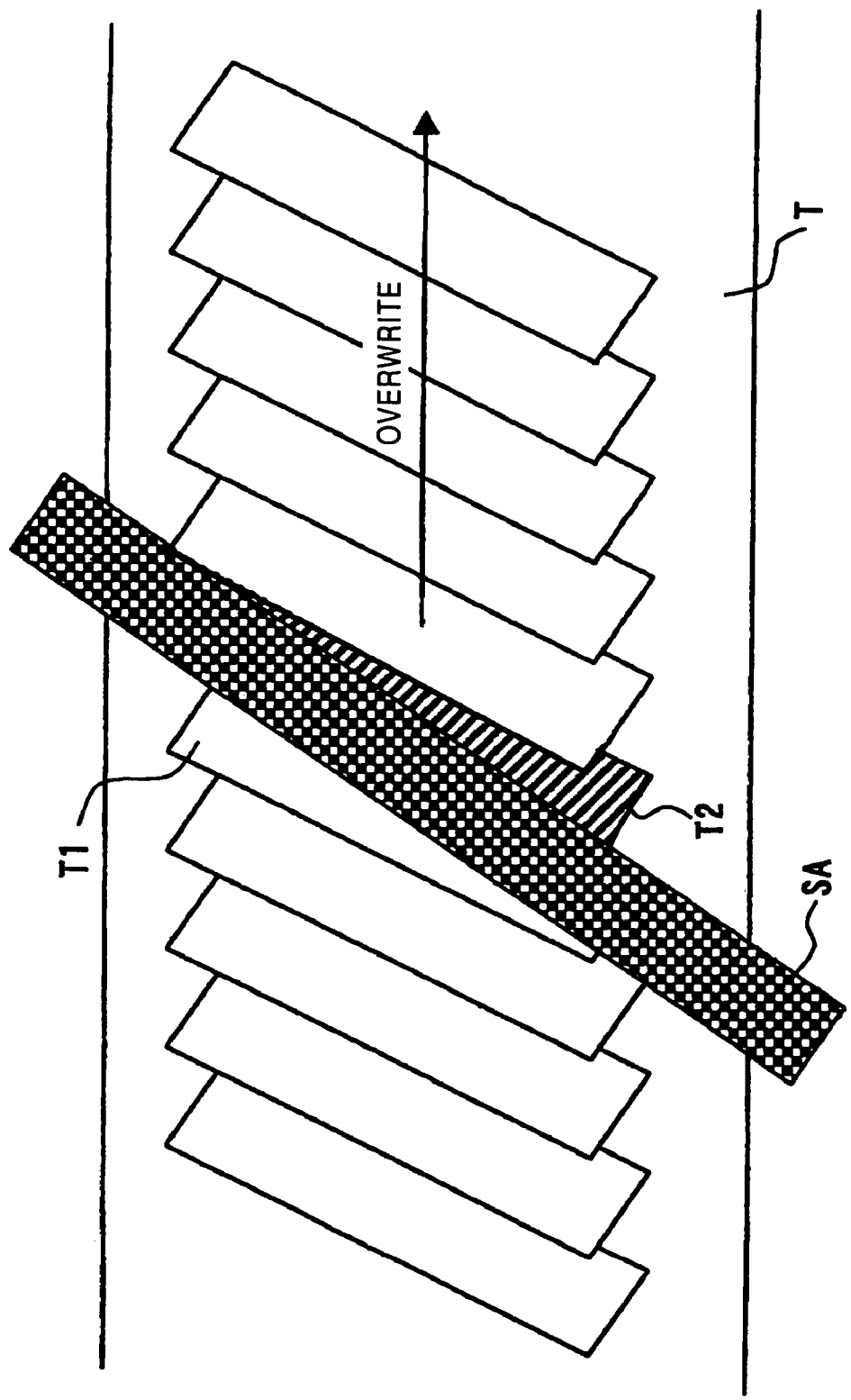
FIG. 3 is an illustration in which a head of the playback system scans over the track information recorded on a magnetic tape by the recording system of the information recording and playback apparatus according to the embodiment of the present invention.

FIG. 3 is an illustration in which the head of the playback system scans over the track information recorded on the magnetic tape by the recording system of the information recording and playback apparatus according to the embodiment of the present invention.

FIG. 3 is an illustration in which newly written tracks are generated by overwriting on tracks which have been written before the recording by the recording system.

A 2T-pattern-recorded track (T2) is provided with recorded data of the predetermined pattern, which is a stripe pattern consisting of two different values repeated alternately and regularly (2T pattern). A recorded track (T1) is a track already recorded before overwriting and is contiguous to the 2T-pattern-recorded track (T2).

Playback-head scanning area SA (area scanned by the playback head 21) spans the recorded track (T1) and the 2T-pattern-recorded track (T2), often generating an error in a playback system of a conventional information recording and playback apparatus. The present invention, however, prevents the generation of an error at this portion and the subsequent portions by recording onto the 2T-pattern-recorded track (T2) a predetermined data pattern that can be easily detected by the PLL 24.

The embodiment of the present invention has been described in relation to the recording head 3 of the recording system, the recording head 3 writing new data on the already-recorded tape T; in general, however, the recording head 3 of the information recording and playback apparatus according to the embodiment of the present invention allows data to be recorded onto the tape T having no information recorded thereon (virgin tape) in the same manner as for overwriting.

As described above, additional data for one track is written at the leading end of data to be newly written during the overwriting process by the recording system, the additional data (predetermined data pattern) facilitating synchronization by the PLL used in the playback system. Furthermore, a playback signal which includes a signal component of the predetermined data pattern is input to the PLL during playback of the newly written data by the playback system, and thereby an accurate clock for playback synchronization is generated by the PLL of the playback system from the beginning of playback of the newly written data. Thus, the present invention prevents the generation of an error during playback of the newly written data.

The invention claimed is:

1. An information recording apparatus using a magnetic tape as a recording medium, the apparatus comprising:
   signal addition means for adding a predetermined data pattern for at least one track to the leading end of main data to be recorded onto the magnetic tape during recording; and
   data recording means for recording the data generated by the signal addition means onto the magnetic tape.

2. The information recording apparatus according to claim 1, wherein the predetermined data pattern is a stripe pattern consisting of two different values repeated alternately and regularly.

3. The information recording apparatus according to claim 2, wherein the stripe pattern is a 2T pattern.

4. The information recording apparatus according to claim 1, wherein the signal addition means comprises:
   signal generation means for generating a signal of the predetermined data pattern; and
   switching means for toggling between a signal of the data to be recorded onto the magnetic tape and a signal of the predetermined data pattern.

5. The information recording apparatus according to claim 1, wherein the magnetic tape is a magnetic tape any portion of which has written data or a magnetic tape no portion of which has written data.

6. An information playback apparatus for playing back a magnetic tape having an additional predetermined data pattern for at least one track at the leading end of recorded main data, the apparatus comprising:
   data discrimination means for discriminating between the recorded main data and the recorded predetermined data pattern from a playback signal generated by playing back a record on the magnetic tape.

* * * * *